UNITED STATES PATENT OFFICE.

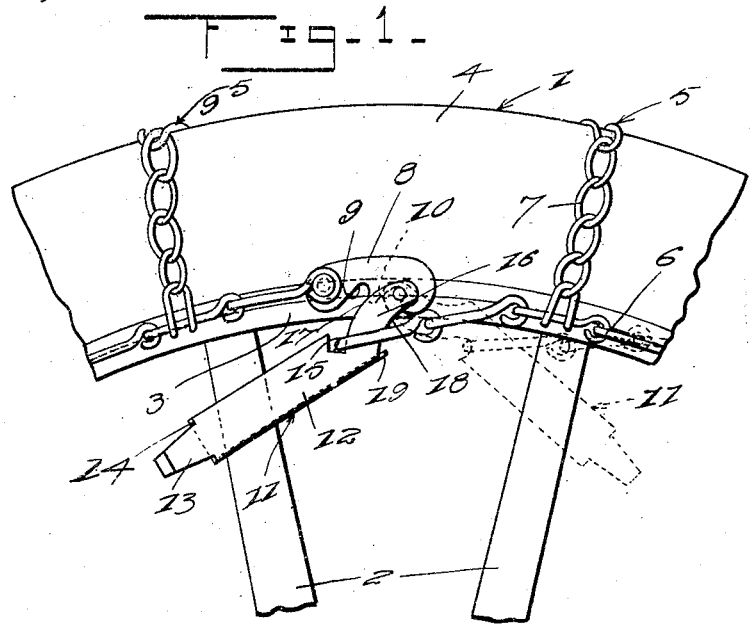

OSCAR J. WATTS, OF KENSINGTON, KANSAS.

COMPOUND TOOL.

1,277,797.　　　　Specification of Letters Patent.　　Patented Sept. 3, 1918.

Application filed November 7, 1916. Serial No. 129,961.

*To all whom it may concern:*

Be it known that I, OSCAR J. WATTS, a citizen of the United States, residing at Kensington, in the county of Smith and State of Kansas, have invented certain new and useful Improvements in Compound Tools; and I do hereby declare the following to be a full, clear, and exact description of the invention, such as will enable others skilled in the art to which it appertains to make and use the same.

This invention relates to new and useful improvements in compound tools and the principal object of the invention is to provide a device which is particularly adapted for use in applying skid chains to the wheels of motor vehicles.

Another object of the invention is to provide a compound tool which is adapted to be used as a bottle opener, screw driver and "Presto-Lite" tank key.

With these and other objects in view the invention consists in the novel combination and arrangement of parts which will be fully set forth in the following specification and accompanying drawing, in which:—

Figure 1 is a fragmentary view of a motor vehicle wheel showing this tool as it would appear in use in applying a skid chain to the wheel.

Fig. 2 is a detail perspective view of the tool.

Fig. 3 is an end view of Fig. 2, and

Fig. 4 is a sectional view on line 4—4 of Fig. 2.

Referring to the drawing the numeral 1 designates as an entirety a motor vehicle wheel having the usual spokes 2 supporting at their outer ends the rim 3. The tire is designated by the numeral 4 and the skid chain designated generally by the numeral 5. The skid chain 5 comprises the usual side chains 6 which are connected by the cross chains 7 and the ends of the chains 6 carry the usual connecting hooks 8 by means of which the skid chains are held in place. These hooks 8 are provided with notches 9 and 10 as clearly shown in the drawing. The notch 10 is positioned near the free end of the hook 8 while the notch 9 is arranged intermediate the ends of said hooks.

The tool is designated generally by the numeral 11 and comprises a transversely U-shaped body or handle portion 12 formed of a single blank of sheet metal having extending from one end thereof a screw driver bit 13. This bit 13 is formed integrally with one of the side walls of the handle 12 and the opposite side wall is provided with an inturned flange 14 as clearly shown in Fig. 2. A notch 15 is formed in each of the side walls of the handle 12 and preferably rectangular in shape to provide a "Presto-Lite" key for manipulating an ordinary "Presto-Lite" tank. As illustrated in Fig. 2, the notch in the side of the handle is provided with a pair of forwardly extending arms 16 which are curved as shown and provided with the convexed edges 17 which are disposed so that their rear ends aline with one wall of the notch 15. The concaved edges 18 of the arms 16 curve inwardly toward the handle and a tongue 19 is formed between the rear ends of the curved edges 18 on the handle to provide a means for lifting bottle caps. The ends of the arms 16 are connected by a suitable rivet 20 which engages in the notch 10 in the connecting link 8 of the skid chain as clearly illustrated in Fig. 1.

It will be apparent from the foregoing that in use the device is swung into the dotted line position as shown in Fig. 1 with the rivet 20 resting in the notch 10 and the link on the opposite end of the chain is then slipped over the end of the handle and engages in the notch 15 whereupon the device is swung over into the full line position shown in Fig. 1 thus tightening the chain and after having reached a predetermined point it will be seen that the link in the notch 15 will slide over the convex edges 17 of the arms 16 until they engage in the notch 9 in the connecting hook 8 at which time the device may be swung back and entirely removed from the wheel. In this way it will be apparent that the necessity of pulling on the chain by hand and the consequent possible injuries to the person is avoided and also efficient means is provided by which a skid chain may be readily applied to a wheel.

While in the foregoing there has been shown and described the preferred embodiment of this invention, it is to be understood that such changes may be made in the combination and arrangement of parts as will fall within the spirit and scope of the invention as claimed.

What is claim is:—

A tool formed from one piece of metal comprising, a handle, being substantially U-shaped in cross section, a pair of parallel arms formed on one end of the handle and extending angularly therefrom and having convex working edges, said U-shaped handle having a transverse notch near one end thereof and adjacent the parallel arms, and a rivet extending through the forward portions of the parallel arms and adapted to engage a link for the purpose described.

In testimony whereof I affix my signature in presence of two witnesses.

OSCAR J. WATTS.

Witnesses:
  J. H. BALL,
  H. E. BALL.

Copies of this patent may be obtained for five cents each, by addressing the "Commissioner of Patents, Washington, D. C."